(12) United States Patent  (10) Patent No.: US 9,014,668 B2
Masuoka  (45) Date of Patent: Apr. 21, 2015

(54) MOBILE TERMINAL DEVICE AND DATA SENDING/RECEIVING SYSTEM

(71) Applicant: Hitachi Consumer Electronics Co., Ltd., Tokyo (JP)

(72) Inventor: Nobuo Masuoka, Chigasaki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 25 days.

(21) Appl. No.: 13/744,016

(22) Filed: Jan. 17, 2013

(65) Prior Publication Data

US 2013/0196629 A1    Aug. 1, 2013

(30) Foreign Application Priority Data

Feb. 1, 2012 (JP) ................. 2012-019423

(51) Int. Cl.
*H04W 12/06* (2009.01)
*H04L 29/06* (2006.01)

(52) U.S. Cl.
CPC ........... *H04W 12/06* (2013.01); *H04L 63/0861* (2013.01)

(58) Field of Classification Search
USPC ............................................. 455/411, 556.1
See application file for complete search history.

(56) References Cited

U.S. PATENT DOCUMENTS

2005/0202782 A1    9/2005    Sasai et al.
2012/0119906 A1*   5/2012    Kountotsis ................... 340/540

FOREIGN PATENT DOCUMENTS

JP    2004-015558 A    1/2004
JP    2009-171234 A    7/2009

* cited by examiner

*Primary Examiner* — Chuong A Ngo (74) *Attorney, Agent, or Firm* — Foley & Lardner LLP (57) ABSTRACT

A mobile terminal device includes a wireless communication unit that wirelessly communicates with another mobile terminal device different from the mobile terminal device; a fingerprint detection unit that reads a user's fingerprint; and a control unit wherein the control unit performs control to create communication information, send the communication information to the another mobile terminal device, detect first fingerprint information on the user by the fingerprint detection unit, receive second fingerprint information on the user, which is detected by the another mobile terminal device, from the another mobile terminal device that received the communication information, and send information to the another mobile terminal device via the wireless communication unit if the first fingerprint information and the second fingerprint information match.

7 Claims, 7 Drawing Sheets

MOBILE TERMINAL DEVICE AND DATA SENDING/RECEIVING SYSTEM

INCORPORATION BY REFERENCE

The present application claims priority from Japanese application JP2012-019423 filed oh Feb. 1, 2012, the content of which is hereby incorporated by reference into this application.

BACKGROUND OF THE INVENTION

1. Field of the Invention

The present invention relates to a mobile terminal device and a data sending/receiving system.

2. Description of Related Art

As a related art of this field of invention, the following technology is disclosed in JP-A-2004-15558. "In the case where wireless communication is performed among a plurality of mobile terminal devices, when a predetermined connection operation is performed in a first mobile terminal device, an inquiry message is wirelessly transmitted in order to discover a device to be connected by the wireless communication after restricting a transmissible distance to a close range; when a predetermined standby operation is performed in a second mobile terminal device, the inquiry message is received and a response message to the received inquiry message is wirelessly transmitted; and when the response message is received, the first mobile terminal device performs the connection processing with respect to the second mobile terminal device."

SUMMARY OF THE INVENTION

According to the technology described in JP-A-2004-15558, a first mobile terminal device wirelessly transmits an inquiry message in order to discover a device with which wireless communication is to be performed with the transmissible distance restricted to a close range. The first mobile terminal device sets a mobile terminal device, which transmits a response message in response to this inquiry message, as a second mobile terminal device. In this case, it is possible that an unintended third-party mobile terminal device also receives the inquiry message and transmits a response message to the first mobile terminal device. The first mobile terminal device, which receives this response message, sets the unintended third-party mobile terminal device as the second mobile terminal device, sometimes with the result that predetermined data is erroneously transmitted to the unintended third-party mobile terminal device.

In view of the foregoing, it is an object of the present invention to provide a data transmission/reception technology with a high security level.

To solve the problem described above, the present invention employs the configuration described in claims.

The present application includes a plurality of means for solving the problem described above. One of them is "a mobile terminal device comprising a wireless communication unit that wirelessly communicates with another mobile terminal device different from the mobile terminal device; a fingerprint detection unit that reads a user's fingerprint; and a control unit wherein the control unit performs control to create communication information, send the communication information to the another mobile terminal device, detect first fingerprint information on the user by the fingerprint detection unit, receive second fingerprint information on the user, which is detected by the another mobile terminal device, from the another mobile terminal device that received the communication information, and send information to the another mobile terminal device via the wireless communication unit if the first fingerprint information and the second fingerprint information match."

According to the present invention, a data transmission/reception technology with a high security level is provided.

The problems other than those described above, the configuration, and the effect will become apparent from the following description of the embodiments of the invention.

Other objects, features and advantages of the invention will become apparent from the following description of the embodiments of the invention taken in conjunction with the accompanying drawings.

DETAILED DESCRIPTION OF THE EMBODIMENTS

An embodiment of the present invention will be described in detail with reference to the drawings.

First Embodiment

Figure 1:
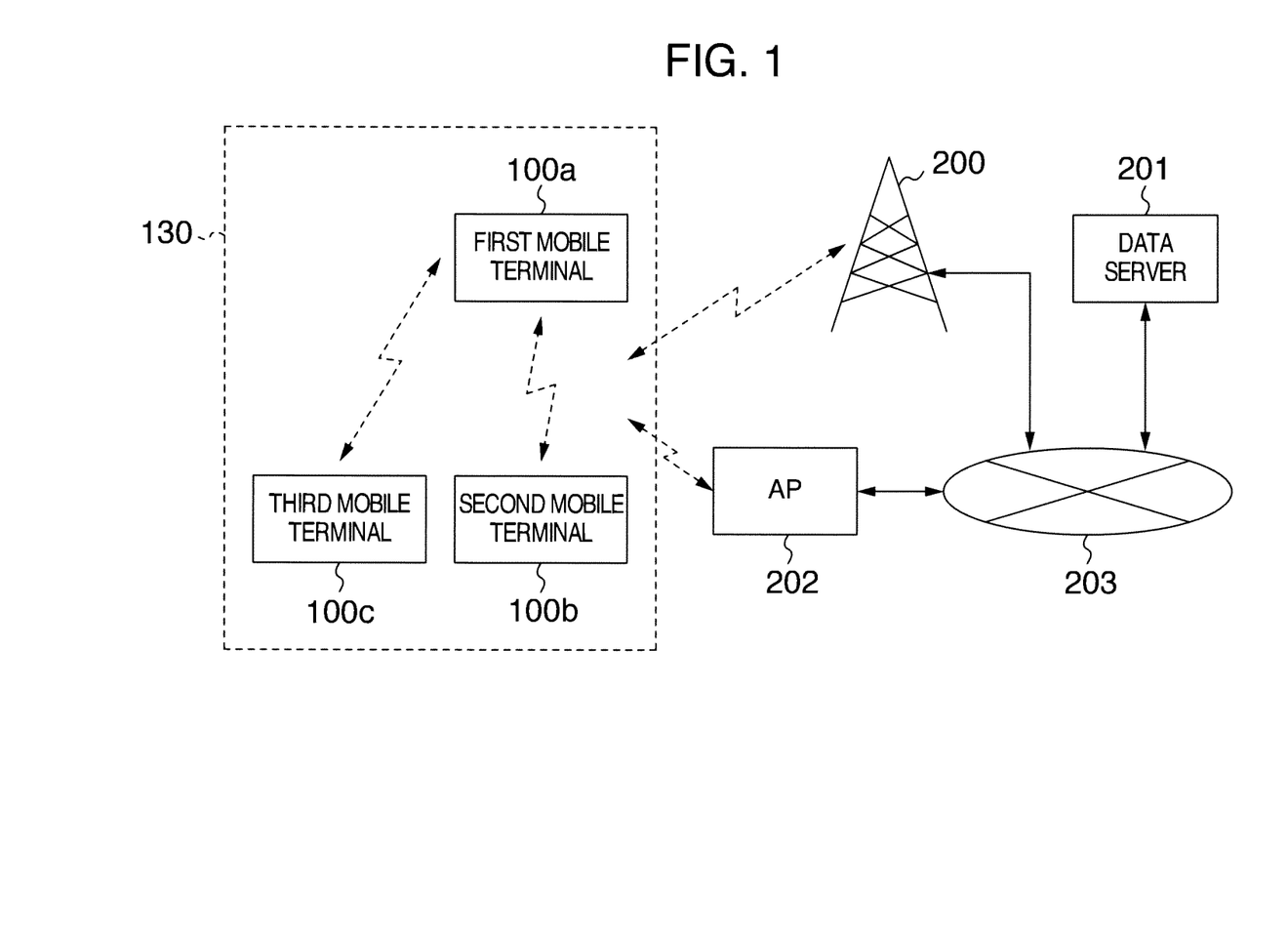
FIG. 1 is a diagram showing an example of a configuration of a data transmission/reception system and an outline of a communication system according to a first embodiment.

FIG. 1 is a diagram showing a configuration of a data transmission/reception, system according to this embodiment and an outline of a communication system for communication with external devices. Referring to FIG. 1, a data transmission/reception system 130 includes a plurality of mobile terminal devices (first mobile terminal device 100a, second mobile terminal device 100b, and third mobile terminal device 100c). The mobile terminal devices 100 can transmit and receive predetermined data (hereinafter called communication data) among them.

For the sake of description, the symbol "a" is attached to those included in the first mobile terminal device 100a, the symbol "b" is attached to those included in the second mobile terminal device 100b, and the symbol "c" is attached to those included in the third mobile terminal device 100c in the description below to distinguish among them. The operator on the first mobile terminal device 100a is called user-a (not shown), the operator on the second mobile terminal device 100b is called user-b (not shown), and the operator on the third mobile terminal device 100c is called user-c (not shown). Although FIG. 1 shows the configuration in which three mobile terminal devices 100 are included, the present invention is not limited to this configuration.

Communication data transmitted and received among the mobile terminal devices 100 described above include address data (such as a name, phone number, mail address, and address), picture data, and moving image data The user can select any desired data.

Communication data may be transmitted and received directly between two mobile terminal devices 100 via a communication method such as a wireless local area network (LAN) (IEEE802.11 a/b/n), Bluetooth (registered trademark), or infrared data communication.

The mobile terminal devices 100 can also communicate wirelessly with a base station 200 via a communication method such as Wideband Code Division Multiple Access (W-CDMA) or Global System, for Mobile Communications (GSM) (registered trademark). In addition, the mobile terminal devices 100 can communicate wirelessly with an access point 202 via a wireless LAN.

The base station. 200 and the access point 202 are connected to the Internet 203. The mobile terminal device 100 can browse a web page, send and receive mail, download a program or data from a data server 201, and upload data to the data server 201 via the base station 200 or the access point 202. Of course, the mobile terminal devices can communicate with each other.

Although the access point 202 is connected directly to the Internet 203 in the example shown in FIG. 1, the present invention, is not limited to this configuration. For example, when the access point 202 is installed in a home, the access point 202 is connected to the Internet 203 via a home gateway (not shown).

Figure 2:
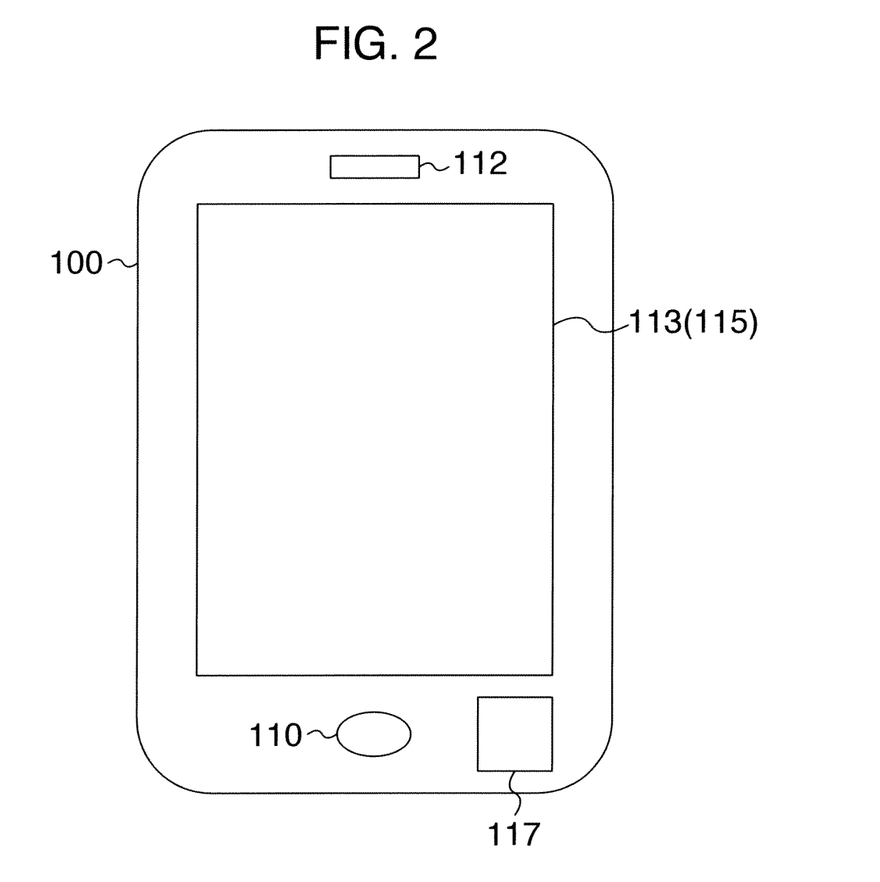
FIG. 2 is a diagram showing an example of an external view of a mobile terminal device used in the data transmission/reception system according to the first embodiment.

FIG. 2 is a diagram showing an example of an external view of the mobile terminal device 100 used in the data transmission/reception system according to this embodiment. In this embodiment, the mobile terminal devices 100 is a smartphone.

The mobile terminal device 100 has a display unit 113, such as a liquid crystal panel and an organic electroluminescence (EL) panel, on the front. On this display unit 113, the mobile terminal device 100 displays text, graphics, pictures, and videos such as moving pictures.

The display unit 113 has an operation input unit 115, such as a touch panel, on its display surface. When the user touches the display surface with a finger or a touch pen, the operation input unit 115 detects its position and sends the signal to a control unit 103. For example, the mobile terminal device 100 displays a menu, such as a list of operation commands, on the display unit 113 to allow the user to touch an operation command in the menu. By detecting its position, the mobile terminal device 100 receives various types of command.

In addition, the mobile terminal device 100 has a fingerprint detection unit 117. When the user places a linger on the fingerprint detection unit 117, the finger detection unit 117 senses the presence of a finger and starts reading the image (fingerprint) of the placed finger.

The mobile terminal device 100 further includes a microphone 110 that receives a voice and a speaker 112 that outputs a voice. Using these units, the mobile terminal device can communicate with another mobile terminal device.

Figure 3:
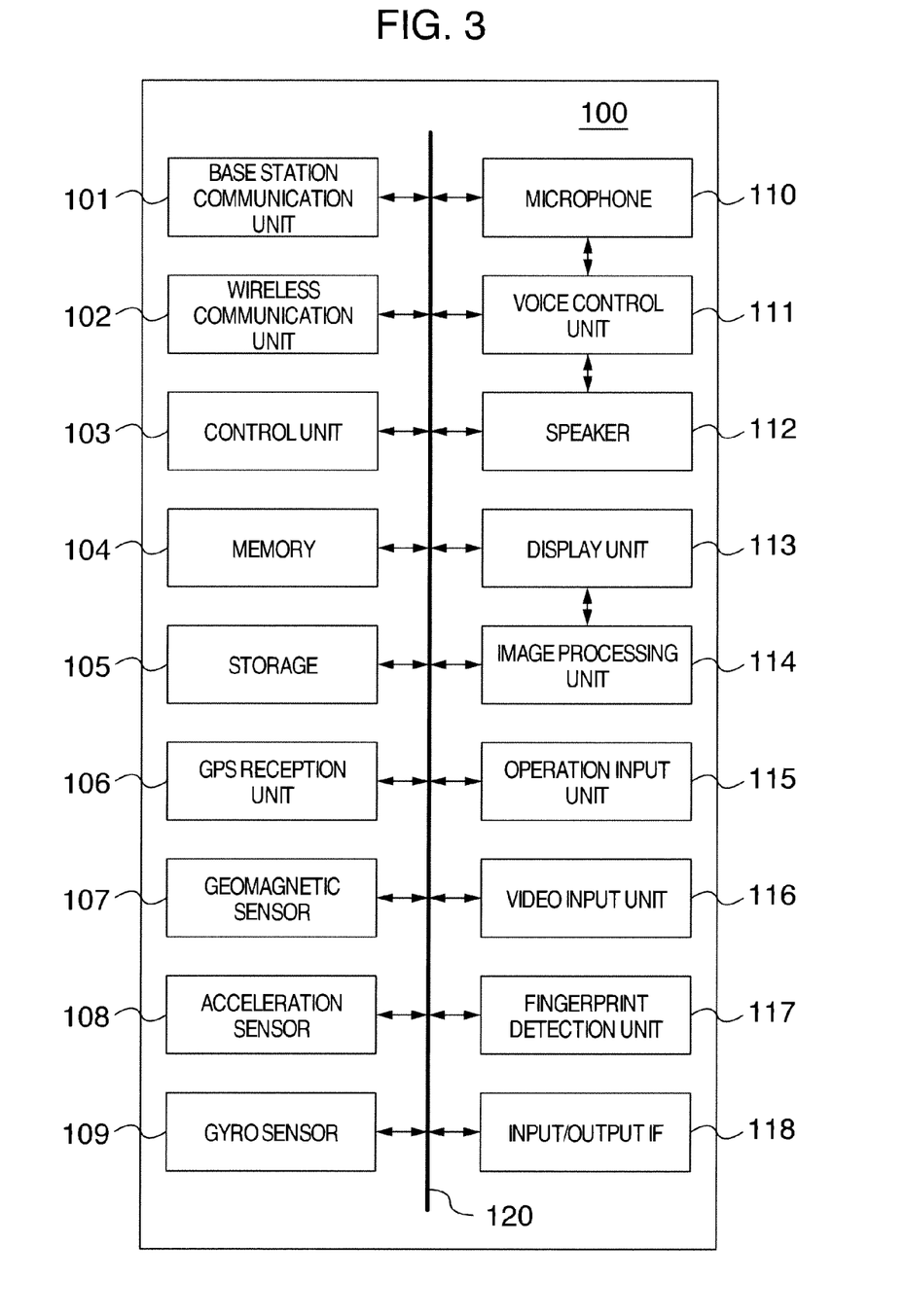
FIG. 3 is a diagram showing an example of a block configuration diagram of the mobile terminal device according to the first embodiment.

FIG. 3 is a diagram showing an example of a block configuration diagram of the mobile terminal device 100 according to this embodiment.

Referring to FIG. 3, the mobile terminal device 100 includes a base station communication unit 101, a wireless communication unit 102, a control unit 103, a memory 104, a storage 105, a global positioning system (GPS) reception unit 106, a geomagnetic sensor 107, an acceleration sensor 108, a gyro sensor 109, the microphone 110, a voice control unit 111, the speaker 112, the display unit 113, an image processing unit 114, the operation input unit 115, a video input unit 116, the fingerprint detection unit 117, and an input/output interface (IF) 118. The component units are interconnected via a system bus 120.

The base station communication unit 101 is a communication interface that performs wireless communication with the base station 200. The communication method is W-CDMA or GSM as described above.

The wireless communication unit 102 is a communication interface that performs wireless communication with the access point 202 or other mobile terminal devices. The communication method is a wireless LAN, Bluetooth (registered trademark), or infrared data communication as described above.

The memory 104, for example, a flash memory, stores programs, which cause the mobile terminal device 100 to perform various operations, and various types of data. The programs or data, stored in the memory 104 may be updated, or new programs or data may be added, as necessary by downloading them from the data server 201.

The control unit 103 performs various operations and processing by executing programs stored in the memory 104.

The storage 105 is a recording device, such as a hard disk or a solid state drive (SSD), or a recording medium such as an IC card, an SI) card, or a DVD.

The GPS reception unit 106 receives signals from a GPS satellite in space to detect the current position of the mobile terminal device 100.

The geomagnetic sensor 107 is a sensor that detects in which direction the mobile terminal device 100 faces.

The acceleration sensor 108 is a sensor that detects the acceleration of the mobile terminal device 100. The gyro sensor 109 is a sensor that detects the angular speed of the mobile terminal device 100. The tilt and the motion of the mobile terminal device 100 can be detected in detail using these sensors.

The microphone 110 receives an external voice, and the speaker 112 outputs a voice to the outside. These voices are controlled by the voice control unit 111.

The display unit 113, a liquid crystal panel or an organic EL as described above, displays image signals (text, graphics, picture, moving image) processed by the image processing unit 114, on the display surface.

The display unit 113 has the operation input unit 115, configured as a touch panel, on its display surface. The operation input unit 115 accepts various operation commands.

The video input unit 116, a camera, etc., can shoot a still image or a moving image. Image data that is shot is saved in the memory 104 or the storage 105.

The fingerprint detection unit 117 reads the image (fingerprint) of a placed finger as described above. The fingerprint that is read is saved in the memory 104 as the fingerprint information.

In the description of the data transmission/reception system 130 in this embodiment, the communication data sending side is the first mobile terminal device 100*a*, and the communication data receiving side is the second mobile terminal device 100*b*. In this embodiment, assume that communication data is not sent to the third mobile terminal device 100*c*.

Figure 4:
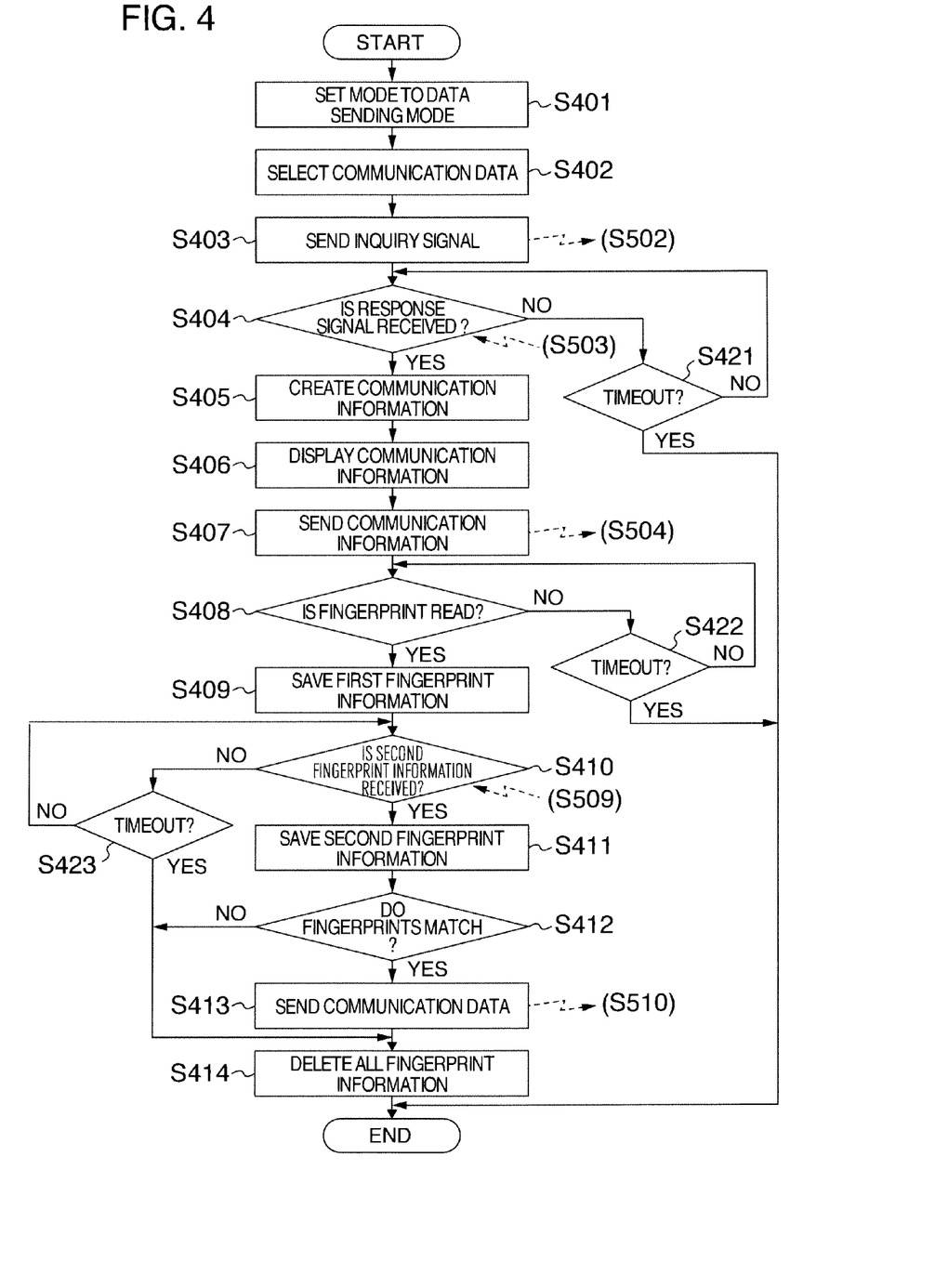
FIG. 4 is a flowchart showing an example of an operation of a first mobile terminal device according to the first embodiment.
Figure 5:
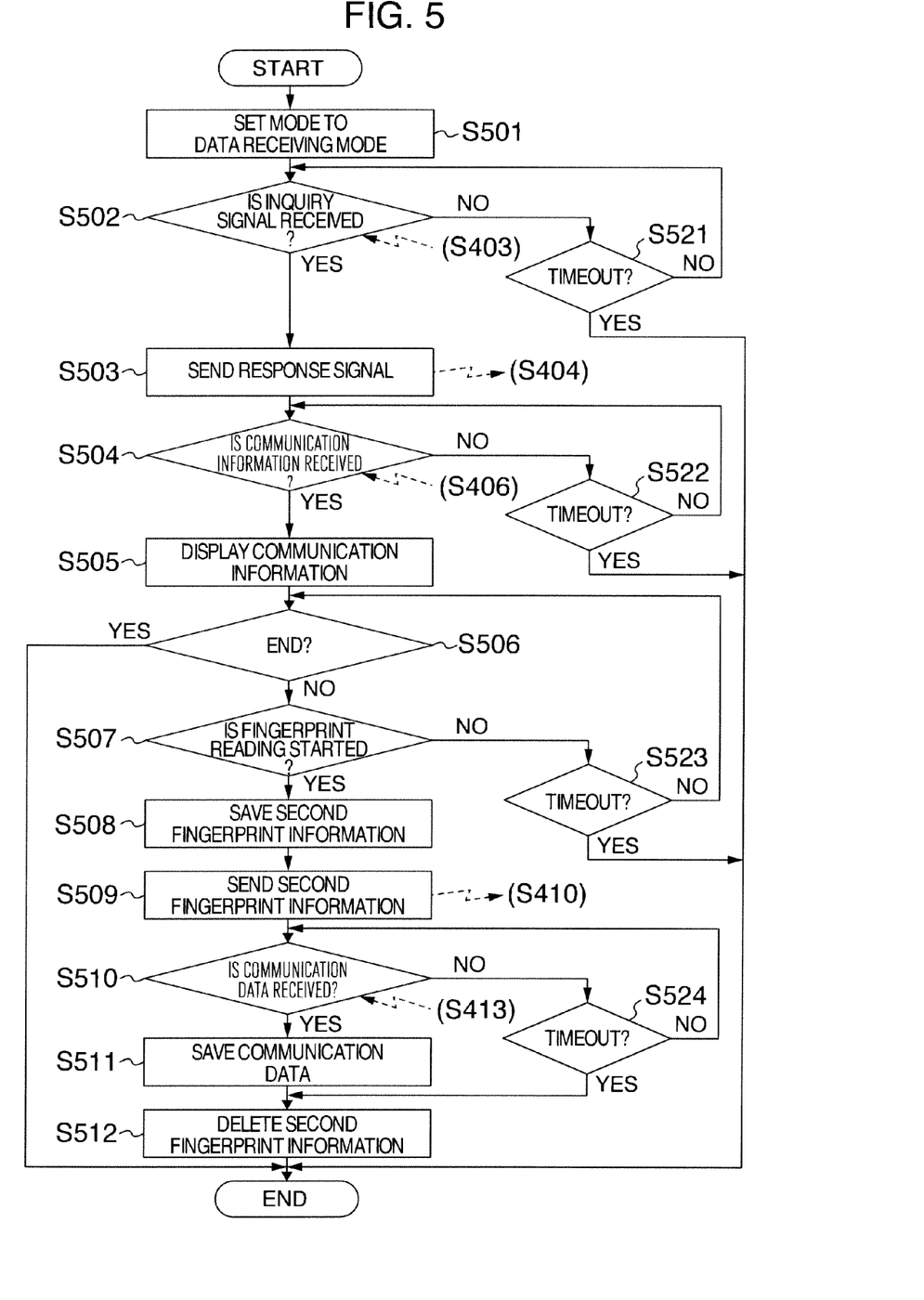
FIG. 5 is a flowchart showing an example of an operation of a second mobile terminal device according to the first embodiment.

FIG. 4 is a flowchart showing an example of operation of the sending side mobile terminal device 100, and FIG. 5 is a flowchart showing an example of operation of the receiving side mobile terminal device 100.

The user sets the first mobile terminal device 100*a* on the sending side in the data sending mode as shown in FIG. 4 (FIG. 4-S401). The first mobile terminal device 100*a* is set in this mode when user-a performs the operation on the operation input unit 115a for selecting the mode from the menu displayed on the display unit 113a.

Next, the user performs operation on the operation input unit 115a to select communication, data (FIG. 4-S402). To do so, the user performs the cursor operation on the operation input unit 115a to select data from the address data or a data folder saved in the memory 104 or the storage 105.

When communication data is selected, the wireless communication unit 102a sends an inquiry signal (FIG. 4-S403). The inquiry signal, saved in advance in the memory 104a, includes a first communication ID (for example, MAC address) for identifying the mobile terminal device 100a on the communication link. The inquiry signal is sent without specifying a particular receiver.

After sending the inquiry signal, the first mobile terminal device 100a monitors if a response signal is received (FIG. 4-S404). In addition, the first mobile terminal device 100a starts measuring the time (FIG. 4-S421). If the resulting measured time is within a predetermined time, the processing returns to the step of monitoring if the response signal is received (FIG. 4-5404). If the response signal is not received even after the predetermined time has elapsed, the first mobile terminal device 100a terminates the processing. It is also possible to select communication data in advance and skip the step (FIG. 4-S402) of selecting communication data.

On the other hand, the user sets the second mobile terminal device 100b on the receiving side in the data receiving mode (FIG. 5-S501). The second mobile terminal device 100b is set in this mode when user-b performs the operation on the operation input unit 115b for selecting the mode from the menu displayed on the display unit 113b.

In the data receiving mode, the second mobile terminal device 100b monitors if an inquiry signal is received from other mobile terminal devices (FIG. 5-S502). In addition, the second mobile terminal device 100b starts measuring the time (FIG. 5-S521). If the resulting measured time is within a predetermined time, the processing returns to the step of monitoring if the inquiry signal is received (FIG. 5-S502). If the inquiry signal Is not received even after the predetermined time has elapsed, the second mobile terminal device 100b terminates the processing.

When the inquiry signal is received (FIG. 5-S502: Yes), the second mobile terminal device 100b extracts the communication ID (in this case, first communication ID) from the received inquiry signal. The extracted first communication ID should be saved in an area in the memory 104b that is inaccessible to the user. This extracted first communication 11) indicates that the received inquiry signal is sent from the first mobile terminal device 100a.

Next, the second mobile terminal device 100b sends the response signal with the first mobile terminal device 100a specified as the sending destination (FIG. 5-S503). The response signal is sent with the second communication ID (for example, MAC address) included. The second communication ID is used to identify the second mobile terminal device 100b on the communication link.

After sending the response signal, the second mobile terminal device 100b monitors if communication information is received (FIG. 5-S504). In addition, the second mobile terminal device 100b starts measuring the time (FIG. 5-S522). If the resulting measured time is within a predetermined time, the processing returns to the step of monitoring if communication information is receiver FIG. 5-504). If communication information is not received even after the predetermined time has elapsed, the second mobile terminal device 100b terminates the processing.

Here, it should be noted that the third mobile terminal device 100c is sometimes be set in the data receiving mode as shown in FIG. 5 (FIG. 5-S501). In this case, the third mobile terminal device 100c receives the inquiry signal from the first mobile terminal device 100a (FIG. 5-S502) and, therefore, sends the response signal, including the third communication ID, to the first mobile terminal device 100a (FIG. 5-S503).

In FIG. 4, when the response signals axe received (FIG. 4-S404; Yes), the first mobile terminal device 100a extracts the communication IDs (in this case, the second communication ID and third communication ID) from the response signals. These response signals indicate that the second mobile terminal device 100b and the third mobile terminal device 100c have sent the response signal. The extracted communication IDs should be saved in an area in the memory 104a inaccessible to the user.

Because the communication IDs are known among those mobile terminal devices, a communication link, is established between the first mobile terminal device 100a and the second mobile terminal device 100b and between the first mobile terminal device 100a and the third mobile terminal device 100c after the inquiry signal and the response signal are sent and received as described above.

In FIG. 4, when the response signal is received (FIG. 4-S404; Yes), the first mobile terminal device 100a creates communication information (FIG. 4-S405) and displays the created communication information on the display unit 113a (FIG. 4-S406). The communication information is information that prevents fingerprint information from being sent erroneously. The communication information, for example, a random combination of symbols, text, and numerals, is created as unique information each, time it is created. Of course, the communication information may be symbols only or text only or numerals only. Although described in this embodiment as a combination of alphabetical letters and numerals for display to the user, the communication information is not limited to this type of information. For example, the communication information may be any information via which the user can recognize that a communication link is established correctly between the sending side mobile terminal device 100 and the receiving side mobile terminal device 100 and via which the user can confirm that the user at the other end is a correct user.

After that, the first mobile terminal device 100a sends the communication information to the mobile terminal, devices (second mobile terminal device 100b and third mobile terminal device 100c), which sent the response signal, using the first communication ID (FIG. 4-S407). Because this communication information is a random combination of symbols and numerals and is used only once, no problem is generated even if user-c on the third mobile terminal device 100c knows the communication information.

When the communication information is received as shown in FIG. 5 (FIG. 5-S504), the second mobile terminal device 100b displays the communication information on the display unit 113b (FIG. 5-S505).

Similarly, when the communication information is received (FIG. 5-S504), the third mobile terminal device 100c displays the received communication information on the display unit 113c (FIG. 5-S505).

Figure 6A:
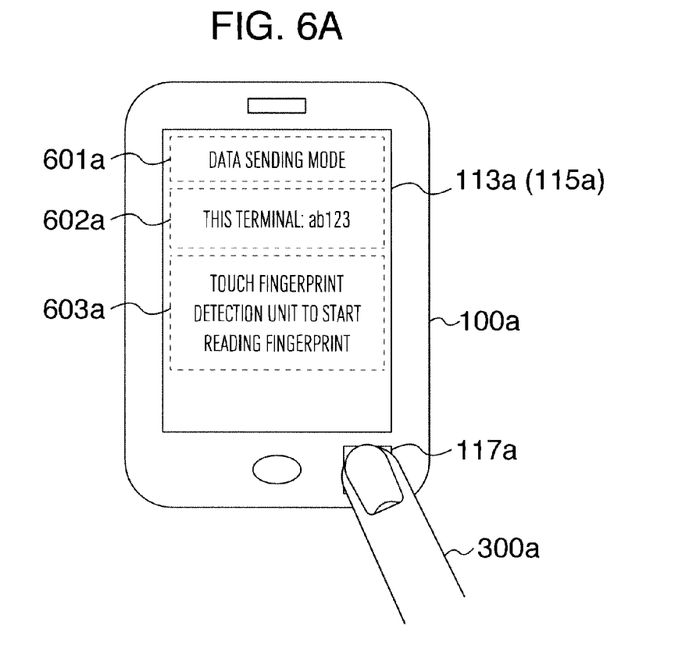
FIGS. 6A, 6B, and 6C are diagrams showing examples of display on the first mobile terminal device and the second mobile terminal device.
Figure 6B:
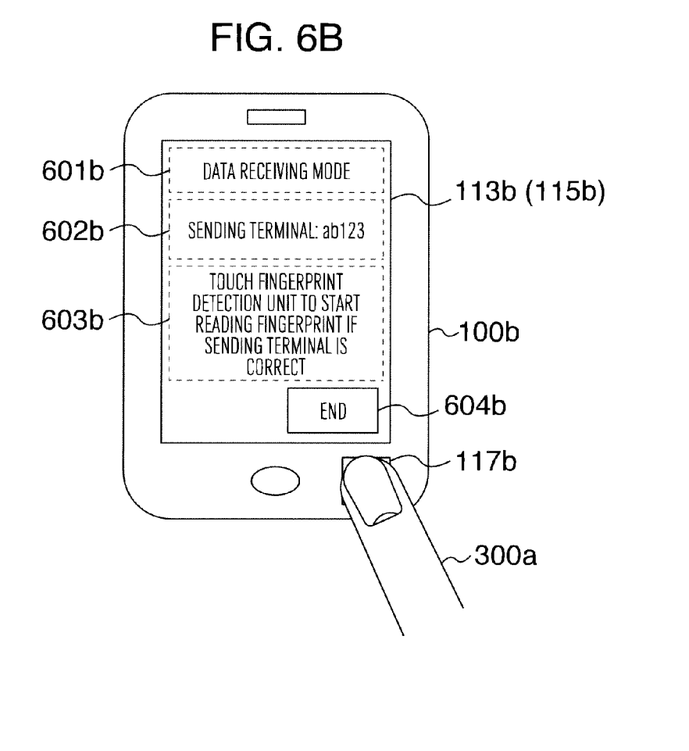
Figure 6C:
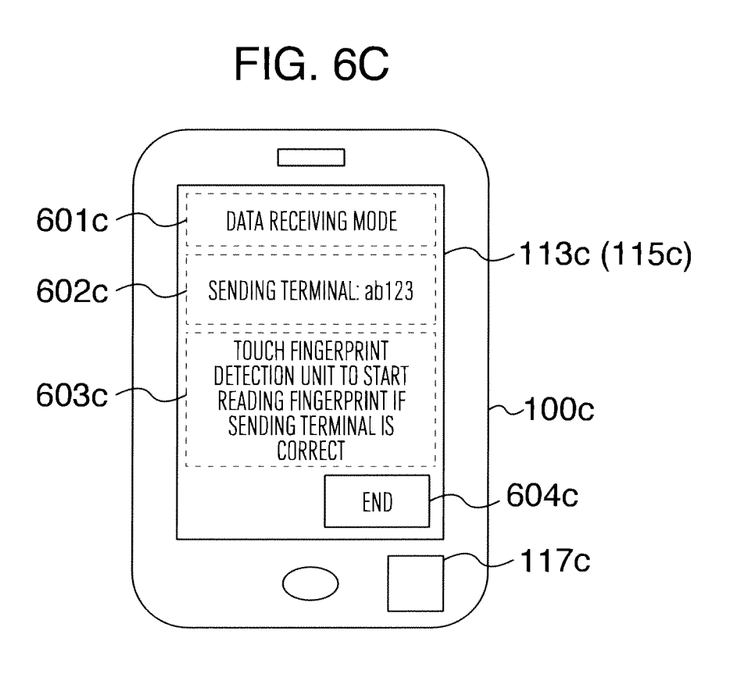

FIGS. 6A, 6B, and 6C are diagrams showing examples of display during communication processing performed by the mobile terminal device 100.

On the display unit 113a of the first mobile terminal device 100a, a current mode 601a (in this case, data sending mode), the communication information 602a that is sent, and a message 603a are displayed. The message 603a is, for example, "Touch fingerprint detection unit to start reading fingerprint".

On the display unit 113b of the second mobile terminal device 100b, a current mode 601b (in this case, data receiving mode), the communication information 602b that is received, and a message 603b are displayed.

On the display unit 113c of the third mobile terminal device 100c, a current mode 601c (in this case, data receiving mode), the communication information 602c that is received, and a message 603c are displayed. The messages 603b and 603c are, for example, "Touch fingerprint detection unit to start reading fingerprint if sending terminal is correct".

User-a views the communication information 602a on the first mobile terminal device 100a, which is the sending side, and the communication information 602b on the second mobile terminal device 100b, which is the receiving side, to confirm that they are the same. After that, as shown in FIGS. 6A and 6B, user-a places a finger 300a on the fingerprint detection unit 117a of the first mobile terminal device 100a and on the fingerprint detection unit 117b of the second mobile terminal device 100b. On the other hand, because the third mobile terminal device 100c is not a terminal intended as the sending destination of the communication data, user-a does not place the finger 300a on the fingerprint detection unit 117c.

If the communication information 602a displayed on the first mobile terminal device 100a and the communication information 602b displayed on the second mobile terminal device 100b are different, the user touches an end button 604b to select the end processing. This is because this situation indicates that the second mobile terminal device 100b has established a communication link with a mobile terminal device (not shown) other than the first mobile terminal device 100a.

In FIG. 4, after the communication information is sent (FIG. 4-S407), the first mobile terminal device 100a on the sending side monitors if the fingerprint detection unit 117a starts fingerprint reading (FIG. 4-S408). In addition, the first mobile terminal device 100a starts measuring the time (FIG. 4-S422). If the resulting measured time is within a predetermined time, the processing returns to the step of monitoring if fingerprint reading is started (FIG. 4-S408). If fingerprint reading is not performed even after the predetermined time has elapsed, the first mobile terminal device 100a terminates the processing.

Fingerprint reading is started when the fingerprint detection unit 117a detects that the finger 300a is placed thereon. Upon detection that the finger 300a is placed, the fingerprint detection unit 117a reads the image (fingerprint) of the finger 300a that is placed. The control unit 103a extracts the characteristics of the fingerprint from the image (fingerprint) data that is read and saves the fingerprint in the memory 104a as the fingerprint information (hereinafter called first fingerprint information) (FIG. 4-S409).

In FIG. 5, after the communication information is displayed (FIG. 5-S505), the second mobile terminal device 100b on the receiving side monitors if the end processing is selected (FIG. 5-S506). If the end processing is selected, the second mobile terminal device 100b ends the processing.

If the end processing is not selected (FIG. 5-S506: No), the second mobile terminal device 100b monitors if the fingerprint detection unit 117b starts fingerprint reading (FIG. 5-S507). In addition, the second mobile terminal device 100b starts measuring the time (FIG. 5-S523). If the resulting measured time is within a predetermined time, the processing returns to the step of monitoring if the end processing is selected (FIG. 5-S506). If the fingerprint detection unit 117b does not start fingerprint reading even after the predetermined time has elapsed, the second mobile terminal device 100b terminates the processing.

Fingerprint reading is started when the fingerprint detection unit 117b detects that the finger 300a is placed thereon. Upon detection that the finger 300a is placed, the fingerprint detection unit 117b reads the image (fingerprint) of the finger 300a that is placed. The control unit 103a extracts the characteristics of the fingerprint from the image (fingerprint) data that is read, saves the fingerprint in the memory 104b as the fingerprint information (hereinafter called second fingerprint information) (FIG. 5-S508), and sends the second fingerprint information to the first mobile terminal device 100a (FIG. 5-S509).

After the second fingerprint is sent, the second mobile terminal device 100b monitors if the communication data is received (FIG. 5-S510). In addition, the second mobile terminal device 100b starts measuring the time (FIG. 5-S524). If the resulting measured time is within a predetermined time, the processing returns to the step of monitoring if the communication data is received (FIG. 5-S510). If the communication data is not received even after the predetermined time has elapsed, the second mobile terminal device 100b deletes the second fingerprint information from the memory 104b (FIG. 5-S512) and terminates the processing.

In FIG. 4, after the first fingerprint information is saved (FIG. 4-S409), the first mobile terminal device 100a monitors if the second fingerprint information is received (FIG. 4-S410). In addition, the first mobile terminal device 100a starts measuring the time (FIG. 4-S423). If the resulting measured time is within a predetermined time, the processing returns to the step of monitoring if the second fingerprint information is received (FIG. 4-S410). If the second fingerprint information, is not received even after the predetermined time has elapsed, the first mobile terminal device 100a deletes the first fingerprint information from the memory 104a (FIG. 4-S414) and terminates the processing.

In FIG. 4, if the second fingerprint information is received (FIG. 4-S410; Yes), the first mobile terminal device 100a temporarily saves the second fingerprint information in the memory 104a (FIG. 4-S411).

The control unit 103a compares the first fingerprint information and the second fingerprint information both of which are saved in the memory 104a (FIG. 4-S412). If the first fingerprint information and the second fingerprint information match (FIG. 4-S412: Yes), the first mobile terminal device 100a sends the communication data to the second mobile terminal device 100b (FIG. 4-S413). After sending the communication data, the first mobile terminal device 100a deletes the first fingerprint information and the second fingerprint information saved in the memory 104a (FIG. 4-S414) and terminates the processing.

If the first fingerprint information and the second fingerprint information do not match (FIG. 4-S412: No), the first mobile terminal device 100a does not send the communication data but deletes the first fingerprint information and the second fingerprint information (FIG. 4-S414), both of this are saved in the memory 104a, and terminates the processing.

In FIG. 5, when the communication data is received (FIG. 5-S510: Yes), the second mobile terminal device 100b saves the communication data in the memory 104b or the storage 105b (FIG. 5-S511). After saving the communication data, the second mobile terminal device 100b deletes the second fingerprint information from the memory 104b (FIG. 5-S5121) and terminates the processing.

On the other hand, if the end processing is selected (FIG. 5-S506: Yes) after the communication information is displayed (FIG. 5-S505), the third mobile terminal device 100c ends the processing. Even if the end processing is not selected in the step of monitoring if the end processing is selected (FIG. 5-S506), fingerprint reading is not started in the step of monitoring if fingerprint reading is started (FIG. 5-S507). Therefore, the processing proceeds to the step of measuring time (FIG. 5-S523) and, in this step, the processing is ended.

In the above description, it is assumed that the third mobile terminal device 100c is set in the data receiving mode. If the third mobile terminal device 100c is in a mode other than the data receiving mode, for example, in the normal mode, no communication link is established with the first mobile terminal device 100a from the beginning. Therefore, there is no possibility that the first mobile terminal device 100a sends the communication data erroneously to the third mobile terminal device 100c.

Even if there is another mobile terminal device other than the second mobile terminal device 100b and the third mobile terminal device 100c that is set in the data receiving mode, the mobile terminal device performs the operation similar to that of the third mobile terminal device 100c. Therefore, there is no possibility that the first mobile terminal device 100a sends the communication data erroneously to that mobile terminal device.

As described above, the first mobile terminal device 100a compares the first fingerprint information with the second fingerprint information and, only when they match, sends the communication data. This prevents communication data from being sera erroneously to an unintended third party mobile terminal device.

In addition, the communication information 602a is displayed on the display unit 113a of the first mobile terminal device 100a on the sending side, and the communication information 602b is displayed on the display unit 113b of the second mobile terminal device 100b on the receiving side, respectively. This display allows the user to easily confirm that a communication link is established between the first mobile terminal device 100a and the second mobile terminal device 100b. The communication link, which is established in this way, prevents the fingerprint information, read by the fingerprint detection unit 117b, from being sent erroneously to a third-party mobile terminal device.

In addition, no problem is generated even if the communication information is sent to an unintended third-party mobile terminal device, because the communication information is composed of a combination of letters and numerals that vary each time the communication information is sent.

Therefore, this embodiment prevents data from being sent erroneously to an unintended third party, thus providing a data sending/receiving technology with high security level.

Although a smartphone is used as an example in the embodiment described above, the present invention is not limited to a smartphone but is applicable also to a mobile phone, a Personal Digital Assistants (PDA), a notebook personal computer (PC), and a tablet PC. The first mobile terminal device and the second mobile terminal device may be different types of terminal, e.g., the first mobile terminal device is a smartphone and the second mobile terminal device is a mobile phone.

In addition, though the finger 300a of user-a is read by the fingerprint detection units 117a and 117b in this embodiment to generate the first and second fingerprint information, the present invention is not limited to this configuration. It is only required that the same finger is placed on the fingerprint detection units 117a and 117b. For example, it is also possible to read a finger 300b (not shown) of user-b via the fingerprint detection units 117a and 117b to generate the first and second fingerprint information.

It is to be understood that the present invention is not limited to the embodiment described above but includes various modifications. For example, it should be noted that the above embodiment is described in detail to make the present invention easy to understand and that the present invention is not limited to a device or a system that always has the entire-configuration described above.

The configurations, functions, processing units, and processing means described above may be implemented, in whole or in part, by hardware, for example, by designing them by-integrated circuits. The configurations and the functions described above may also be implemented by software by interpreting and executing the programs via which the processor implements the functions.

The information about the programs, tables, and files for implementing the functions may be placed in the memory 104 or the storage 105.

The control lines and information lines necessary for the description are included and, so, not all control lines and information lines are necessary to manufacture the product. In practice, it is considered that all the configurations are interconnected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile terminal device comprising:
a wireless communication unit configured to wirelessly communicate with another mobile terminal device different from said mobile terminal device;
a display unit configured to display image information;
a fingerprint detection unit configured to read a user's fingerprint; and
a control unit wherein said control unit is configured to perform control to create communication information,
display the communication information on said display unit,
send the communication information to said another mobile terminal device,
detect first fingerprint information on the user by said fingerprint detection unit,
receive second fingerprint information on the user, which is detected by said another mobile terminal device, from said another mobile terminal device that received the communication information, and
send the predetermined data selected from a menu displayed on the display unit to said another mobile terminal device via said wireless communication unit when the first fingerprint information and the second fingerprint information are identified as the same.

2. The mobile terminal device according to claim 1 wherein the communication information is varied each time the communication information is created.

3. The mobile terminal device according to claim 1 wherein the communication information is information indicating to the user that a communication link is established between said mobile terminal device and said another mobile terminal device.

4. A data sending/receiving system that includes a first mobile terminal device and a second mobile terminal device wherein said first mobile terminal device is configured to
  create communication information,
  display the communication information on a display unit of the first mobile terminal,
  send the communication information to said second mobile terminal device via a wireless communication unit, and
  detect first fingerprint information on a user by a fingerprint detection unit, wherein
said second mobile terminal device is configured to
  receive the communication information from said first mobile terminal device via a wireless communication unit,
  display the received communication information on a display unit of said second mobile terminal,
  detect second fingerprint information on the user by a fingerprint detection unit, and
  send the second fingerprint information to said first mobile terminal device, wherein
said first mobile terminal device is configured to
  receive the second fingerprint information sent by said second mobile terminal device and
  send the predetermined data selected from a menu displayed on the display unit to said second mobile terminal device when the first fingerprint information and the second fingerprint information are identified as the same and wherein
said second mobile terminal device is configured to
  receive the information sent by said first mobile terminal device.

5. The data sending/receiving system according to claim 3 wherein
  said first mobile terminal device is configured to vary the communication information each time the communication information is created.

6. The data sending/receiving system according to claim 3 wherein
  the communication information is information indicating to the user that a communication link is established between said first mobile terminal device and said second mobile terminal device.

7. The data sending/receiving system according to claim 5 wherein
  the communication information is information indicating to the user that a communication link is established between said first mobile terminal device and said second mobile terminal device.

\* \* \* \* \*